UNITED STATES PATENT OFFICE.

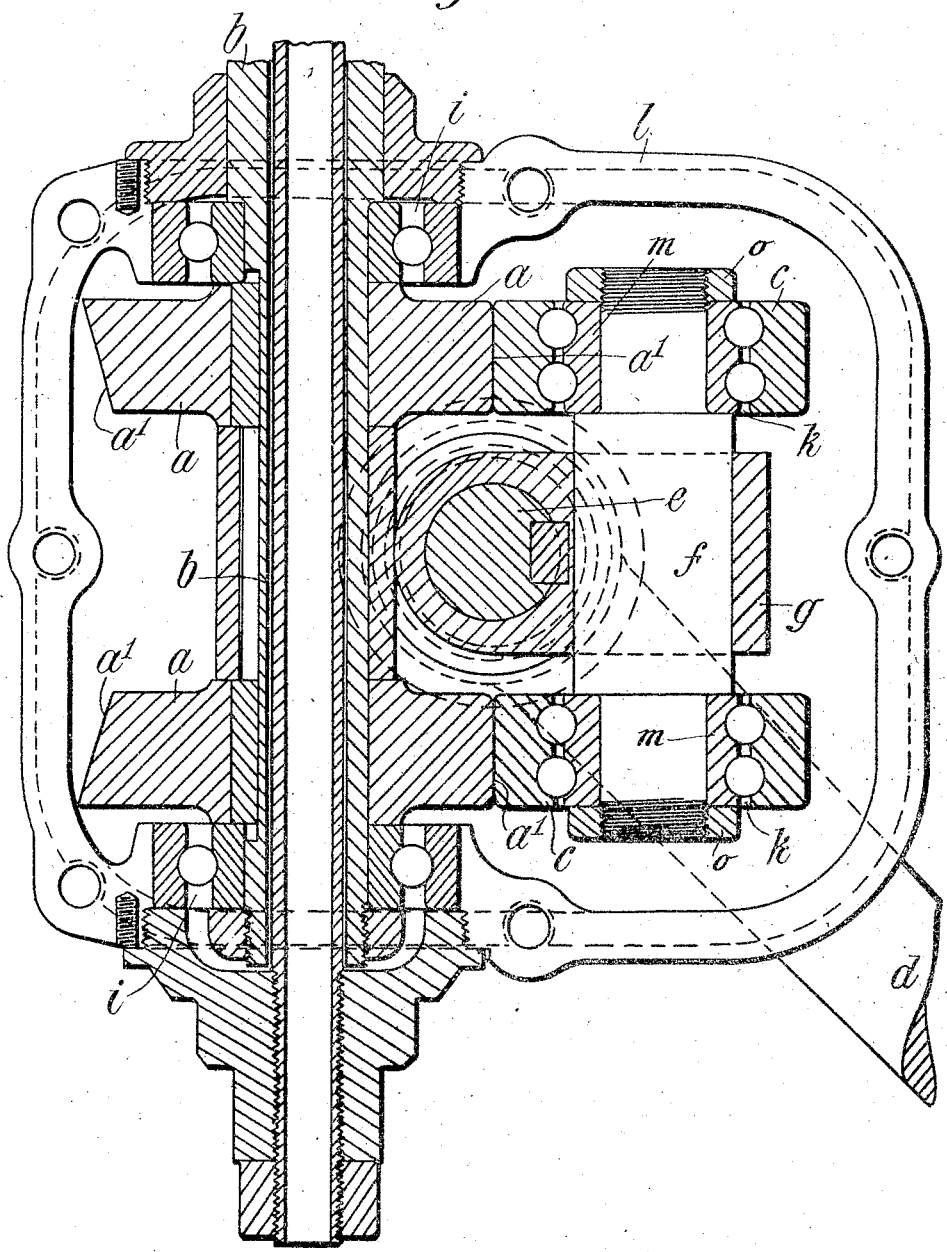

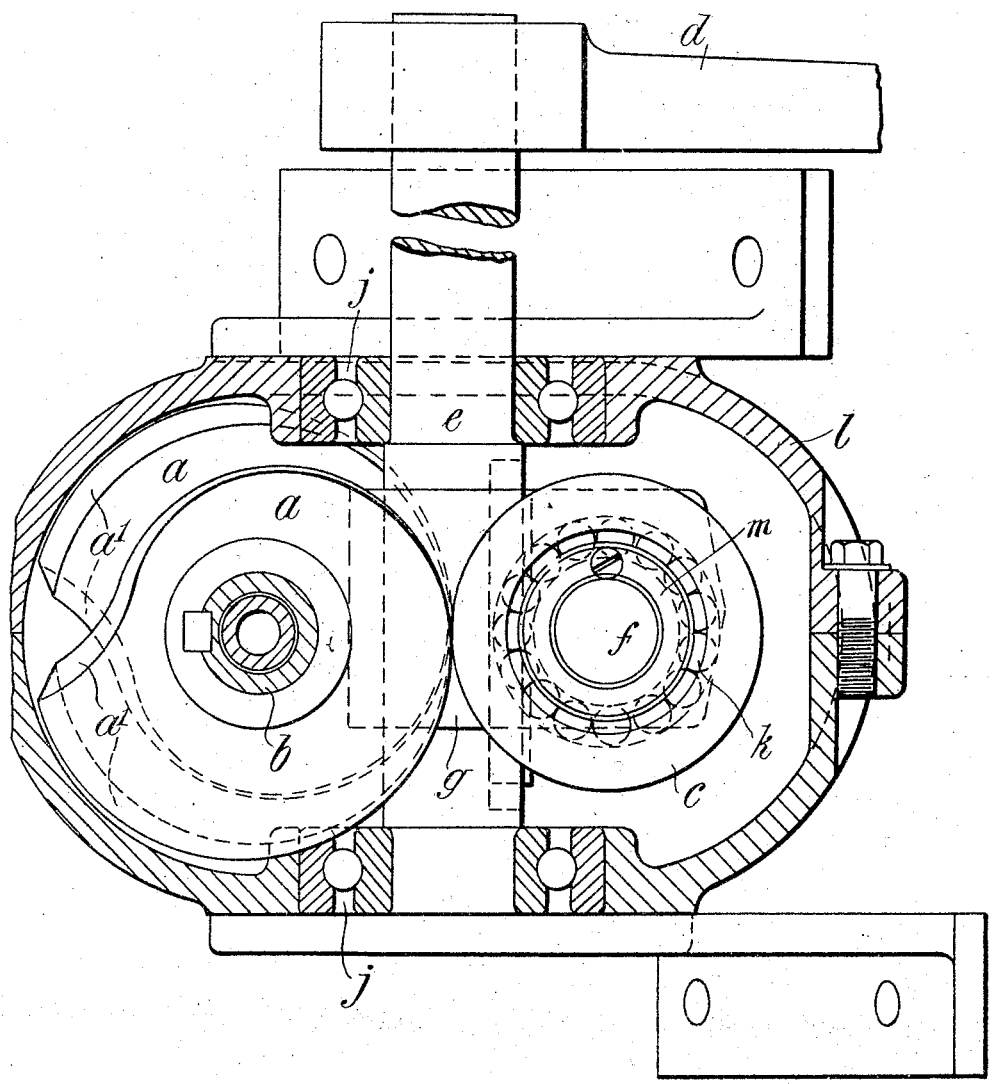

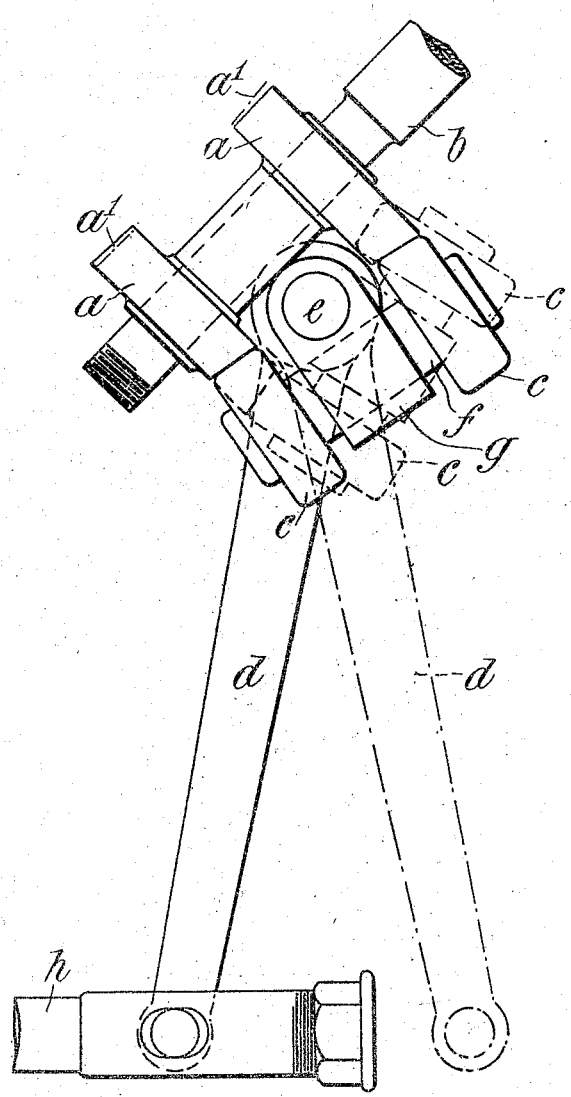

HENRY MARLES, OF MANOR PARK, ENGLAND.

STEERING-GEAR FOR MECHANICALLY-PROPELLED VEHICLES.

1,189,985.      Specification of Letters Patent.      Patented July 4, 1916.

Application filed November 7, 1914. Serial No. 870,895.

*To all whom it may concern:*

Be it known that I, HENRY MARLES, a subject of His Majesty the King of England, residing at Manor Park, in the county of Essex, Kingdom of England, have invented certain new and useful Improvements in Steering-Gears for Mechanically-Propelled Vehicles, of which the following is a specification.

This invention relates to improvements in cam operated steering gear for motor cars and other mechanically propelled vehicles. Heretofore in this kind of steering gear it has been proposed to operate a grooved cam or equivalent surface by the rotation of the steering column, the said cam being in engagement with a roller on the end of the steering lever. Now the present invention is chiefly distinguished from the previously known gear of this kind in that the steering road wheels are operated and controlled by means of opposed cams or cam surfaces which are secured or formed on, or operatively connected to, the steering column.

The object of the invention is to provide a steering gear of such construction that there will be no loss of motion or slip between the steering wheel and the road wheels and the steering wheels are incapable of movement irrespective of the steering column.

The invention is hereinafter described with reference to the accompanying drawings in which:—

Figure 1 is a sectional elevation of the improved steering gear, showing the cams and rollers in mid position when the car would be traveling approximately in a straight line; Fig. 2 is a sectional plan of same; Fig. 3 is a diagrammatic view of the gear showing it in its two extreme positions.

In my steering gear I employ the well known type of hand-wheel and revoluble column. A pair of cams are preferably so arranged that when the hand-wheel is revolved one way, the face of one cam operates the steering arm in the direction and the face of the other cam prevents "back lash," and vice versa when the hand-wheel is turned in the other direction.

A pair of preferably volute or snail-shaped cams $a$ are mounted upon a rotary steering column $b$, the cams being suitably spaced apart and adapted to be engaged by a pair of rollers $c$. A bracket $g$ is provided with two openings located at right angles to each other. A pivot $e$ extends through one of the openings and is keyed to the bracket, the pivot being located midway between the two cams $a'$. A pin $f$ extends through the other opening of the bracket $g$ and the ends of the pin are reduced, the reduced ends or portions being preferably screw-threaded at their outer terminals. Rings $m$ are mounted upon the reduced portions and are held in position by means of nuts $o$ which have screw-threaded engagement with the ends or reduced portions of the pin $f$. Interposed between the rings $m$ and the rollers $c$ are ball or roller bearings $k$. A steering arm $d$ is connected to the pivot $e$ and oscillates with the pivot which is actuated on the rotation of the cams $a'$.

The volute cams referred to are preferably formed from flat disks of a substantial thickness so as to provide satisfactory cam faces $a'$ for the rollers to bear upon. These cam faces preferably continue around the entire circumferences of the disks.

The throw or rise of each cam is approximately determined by the difference between the maximum and minimum diameters of same, the cam face starting from the minimum diameter and rising or receding from the center throughout the circumference to the maximum diameter. This rise or throw of the cam face may be regular in relation to the circumference, or it may be irregular. Or the cam may take the form of an eccentric or an ellipse. In either of the latter cases however, the throw or rise would not continue throughout the whole revolution.

The pair of cams $a$ are arranged upon the steering column $b$ so that the rise of one is in the opposite direction to the other and in exactly equal ratio as shown. Thus one of the rollers $c$ bears upon one cam face and the other roller upon the other cam face in such a way that the steering arm $d$ cannot move unless the cams are revolved. When the cams $a$ are revolved by means of the hand-wheel and column $b$ the face of one rises or advances from the center of said column and the face of the other recedes thus imparting a rocking movement to the pivoted steering arm $d$ the lower end of which operates the usual horizontal steering rod $h$. If the edges or working faces of the cams are made parallel with the axis of the steering column $b$ throughout their whole circumferences it will be necessary to mount the rollers spherically as the pivoting movement of the steering arm throws the axes of said rollers out of parallel with the steering column; or the faces of the rollers could be formed convex. But I prefer to avoid this by forming the cam faces $a$ with a constantly varying angle as shown, so that they adapt themselves as they rotate to the varying angle assumed by the faces of the rollers $c$. To reduce friction, ball or roller bearings may be employed upon the steering column at $i$, and upon the bearings of the pivot $e$ at $j$ and within the rollers $c$ at $k$.

Instead of the foregoing arrangement I may form the cams $a$ $a'$ as spiral surfaces surrounding the steering column $b$ the rollers $c$ $c$ would then operate in a more or less vertical direction.

What I claim as my invention and desire to secure by Letters Patent of the United States is:—

1. A steering gear, comprising a vertical steering column, spaced apart cams on the steering column, having opposed cam surfaces, a horizontal pivot nested between the cams in close proximity to the steering column, a bracket keyed at one end upon said pivot and projecting outwardly between the cams from the steering column, a pin secured vertically through the outer end of the bracket, and having its ends projecting laterally beyond the bracket in spaced relation to and in the planes of the cams, rollers on the opposite ends of the pin for contact with the respective cams, and a steering arm carried upon the horizontal pivot.

2. A steering gear for mechanically propelled vehicles, comprising a steering column, spaced apart cams on the steering column having opposed cam surfaces, a bracket located against the steering column between said cams, and extending outwardly from the steering column, the bracket being provided with a vertical opening in its outer end, and a horizontal opening in its inner end, a pin mounted in the vertical opening in the outer end and projecting beyond the sides of the bracket, rollers mounted on the ends of said pin, and engaging the cams, a horizontal pivot keyed in the horizontal opening of the bracket, between the cams, and in close proximity to the steering column, and a steering arm operatively connected to said pivot.

3. A steering gear comprising a steering column, cams mounted on the steering column having opposed cam surfaces, a bracket lying close to the steering column between the cams, and extending outwardly therefrom, said bracket having a vertical opening and a horizontal opening in its outer and inner ends respectively, a horizontal pivot lying close to the steering column between the cams and extending through the horizontal opening, and keyed to the bracket, a steering arm operatively connected to the pivot, a pin extending through the vertical opening at right angles to the bracket, and outwardly of said horizontal pivot, and having the ends thereof reduced and screw threaded, rings mounted upon the reduced ends of the pin, rollers bearing against the cam surfaces and encircling the rings, balls interposed between the rings and the rollers, and nuts secured upon the reduced ends of the pin for fastening the rings and rollers thereon.

In testimony whereof I have signed this specification in the presence of two subscribing witnesses.

HENRY MARLES.

Witnesses:
J. S. WITHERS,
FRANK BLAKEY.